Dec. 26, 1922.
E. J. DUBOIS ET AL.
METHOD OF MANUFACTURING PISTON RINGS.
ORIGINAL FILED MAY 12, 1921.
1,440,283
2 SHEETS-SHEET 1
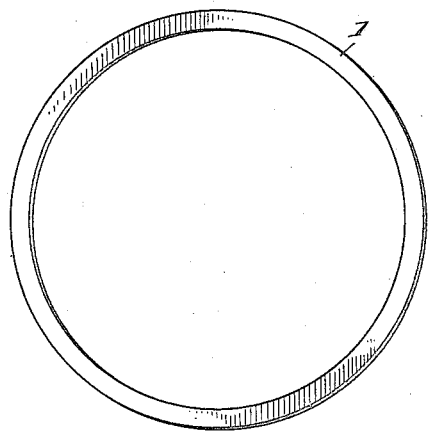
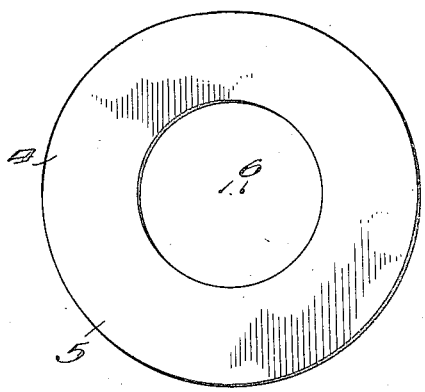
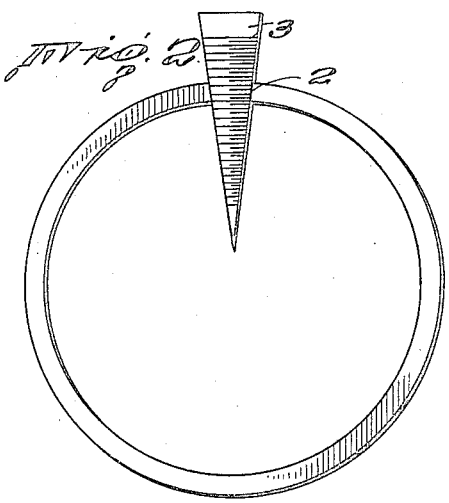
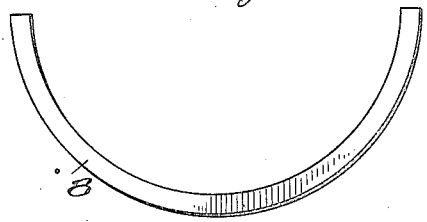
Inventor.
Edward J. DuBois
George C. DuBois
By 
Attorney Dec. 26, 1922.  1,440,283
E. J. DUBOIS ET AL.
METHOD OF MANUFACTURING PISTON RINGS.
ORIGINAL FILED MAY 12, 1921.  2 SHEETS-SHEET 2
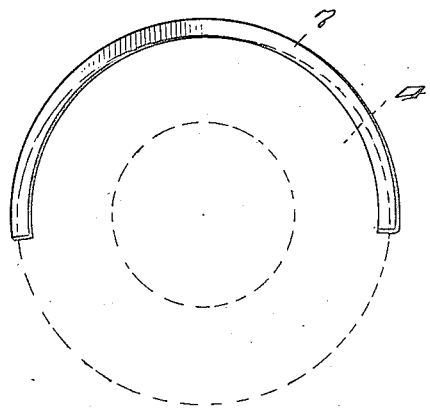
Fig. 5.
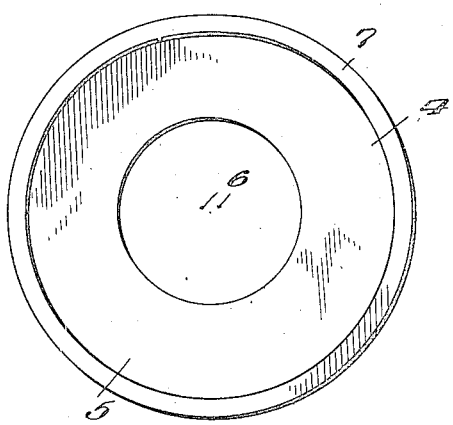
Fig. 7.
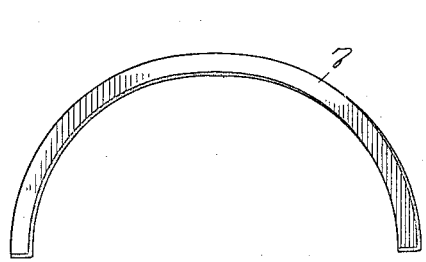
Fig. 6.
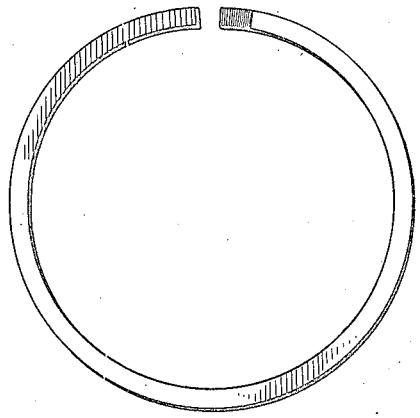
Fig. 8.
Inventors
Edward J. DuBois
George C. DuBois
Attorney Patented Dec. 26, 1922.

1,440,283

UNITED STATES PATENT OFFICE.

EDWARD J. DU BOIS AND GEORGE C. DU BOIS, OF ALBANY, NEW YORK.

METHOD OF MANUFACTURING PISTON RINGS.

Application filed May 12, 1921, Serial No. 468,999. Renewed November 13, 1922. Serial No. 600,692.

*To all whom it may concern:*

Be it known that we, EDWARD J. DU BOIS and GEORGE C. DU BOIS, citizens of the United States of America, residing at Albany, county of Albany, and State of New York, have invented new and useful Improvements in Methods of Manufacturing Piston Rings, of which the following is a specification.

The invention relates to a method of manufacturing piston rings.

The object of the present invention is to improve the method of manufacturing piston rings, more especially the method of making a pattern of distorted circular shape to be made without the complete pattern possessing the resiliency or spring which is present in a pattern formed directly from a circular ring distorted or expanded into the desired non-circular shape. It has been found by experience that when a non-circular ring is distorted or expanded to produce a pattern ring, that the strains and stresses set up in the ring by the expansion or distortion are liable to affect the form of the pattern and the accuracy of the castings made therefrom, particularly when it is necessary to perforate the pattern in the use of the same.

It is also an object of the invention to enable a pattern to be constructed not only without the above strains or tensions but which will enable the desired expansive pressure to be readily obtained in the finished piston rings.

The invention consists primarily in splitting a circular pattern ring of the required size in the completed piston ring plus shrinkage and finishing, and expanding the split circular piston ring, the desired amount to produce in the complete piston ring the required resiliency or expansive pressure, forming a templet to fit the interior of the expanded ring and then bending a pattern ring of separate sections to fit the templet and thereby form a pattern without the aforesaid strains or stresses for casting piston rings.

The invention also consists in bending up the pattern rings of a lower substantially semicircular segment to fit the lower half of the templet, and a separate upper section or segment consisting of a ring section of the diameter of the original pattern ring and slightly in excess of one-half of the same and distorting or expanding the upper section or segment until the ends of the same coincide with the terminals of the lower section or segment and finally connecting the terminals of the upper section or segment to the ends of the lower section or segment to form a complete pattern.

In the drawings;

Figure 1 is a plan view of the circular pattern ring before cutting.

Figure 2 is a similar view showing the pattern ring cut and expanded.

Figure 3 is a plan view of the templet conforming to the configuration of the inner face of the expanded or distorted pattern ring.

Figure 4 is a detail plan view of the lower section of the pattern.

Figure 5 is a similar view of the upper section of the pattern before the same is expanded or distorted.

Figure 6 is a plan view of the upper section or segment of the pattern after the same has been expanded and spread.

Figure 7 is a plan view of the complete pattern showing the same arranged on the templet.

Figure 8 is a plan view of the complete piston ring.

In the drawings, in which is illustrated the preferred embodiment of the invention, 1 designates a circular pattern ring of the required diameter to fit the cylinder for which the piston rings are designed, plus shrinkage and the stock necessary for finishing the cast rings. This pattern ring 1 is then cut at 2 by any suitable means and the ring is expanded or distorted preferably by introducing a graduated wedge 3 between the terminals of the metal at the cut 2. The amount of the expansion may be varied to vary the degree of the expansive pressure exerted by the complete piston ring against the interior of the cylinder and after the ring has been expanded to the required amount, a templet 4, conforming to the configuration of the interior or inner face of the expanded pattern ring is made. The templet may be constructed of sheet metal or any suitable material and its lower half 5 is substantially and for all practical purposes, a true half circle the distortion being comparatively slight and not affecting the fit of the complete ring which, as hereinafter explained is dressed and finished true to the interior of the cylinder in which it is designed to operate. The upper half of the templet is formed by two arcs whose centers 6 are slightly above and slightly to the right and left of the geometric center of the templet.

In building up a pattern from which to cast the piston rings, separate upper and lower sections or segments 7 and 8 are employed. The lower section or segment 8 is substantially semicircular and the upper section or segment is formed by cutting a section or segment slightly in excess of one-half of a ring corresponding in diameter with the original pattern ring 1. This upper section 7 is then spread or expanded by peening or other means until the ends of the upper section coincide with the ends of the lower section. This spreading or expanding of the upper section results in a bending at the center and the formation of side portions of the separate arcs heretofore described. The ends of the upper section are then dressed until the expanded or spread upper section and the lower section fit the templet. The terminals of the upper section or segment are then secured to the ends of the lower section or segment to form a complete pattern and it will be apparent that as the complete pattern is formed from two separate sections or segments, there will be none of the stresses or strains in the complete pattern that are present in patterns made from a complete ring distorted from an original circular base into the required form of the pattern.

After the pattern is complete the piston rings are cast in the usual manner and the cast piston rings are dressed and a section equal to the amount of expansion of the original pattern ring is cut from the top of the casting and the ring is then closed and finished by machining in the usual manner to correspond with and fit the interior of the cylinder for which it is intended. The finished ring will, when compressed within a cylinder accurately fit the interior thereof throughout its entire circumference and it will exert a uniform expansive pressure which in the construction of the pattern may be varied to the desired degree.

What is claimed is:

1. In the manufacture of cast piston rings, the method of making a pattern which consists in crosscutting a circular ring of the required size, spreading the ends of the ring at the cut to expand the split ring to obtain the desired expansive pressure in the complete piston rings, making a templet to fit the interior of the expanded ring and bending a pattern ring of separate sections to fit the templet and connecting the sections to form a complete pattern without the strains or stresses resulting from the distortion of a ring of circular form.

2. In the manufacture of cast piston rings, the method of making a pattern which consists in crosscutting a circular ring of the required size, spreading the ends of the ring at the cut to expand the split ring to obtain the desired expansive pressure in the complete piston rings, making a templet to fit the interior of the expanded ring and bending a pattern ring of separate sections, one of the separate sections or segments corresponding to approximately one-half of the templet and the other section or segment being formed from a circular ring corresponding in diameter to the original pattern ring and expanding or distorting the latter section or segment into side portions having arcs of different centers and connecting the ends of the two sections or segments to each other.

3. In the manufacture of cast piston rings, the method of making a pattern which consists in cutting and expanding a circular ring, forming a templet to fit the interior of the expanded ring and bending up a pattern of separate sections to fit the templet.

4. In the manufacture of cast piston rings, the method of making a pattern which consists in forming a templet corresponding to the cast piston ring and bending a pattern of separate sections or segments to fit the templet.

In testimony whereof we have hereunto set our hands.

EDWARD J. DU BOIS.
GEORGE C. DU BOIS.